Dec. 20, 1938.   G. K. NEWELL   2,141,070
DIAPHRAGM FOOT VALVE
Filed Sept. 14, 1937
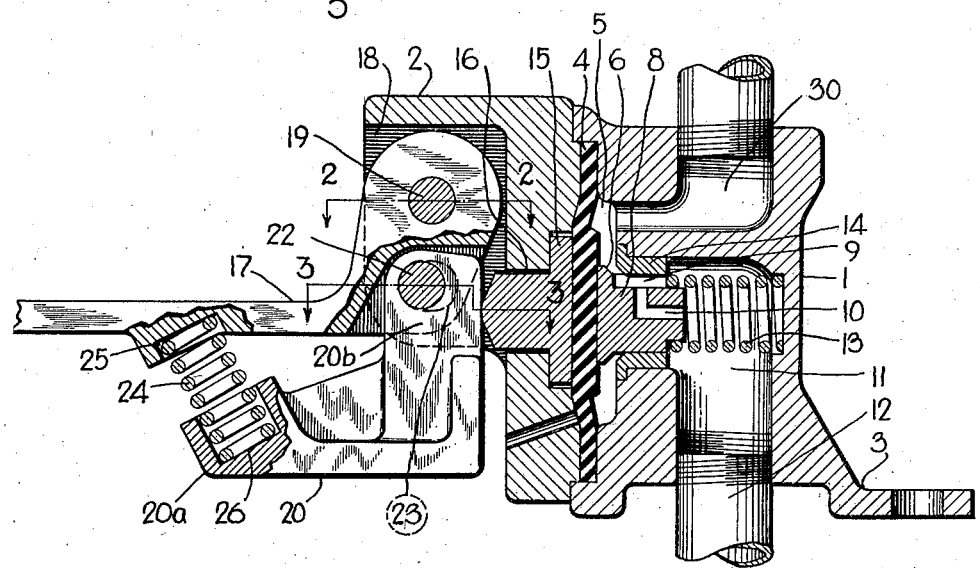
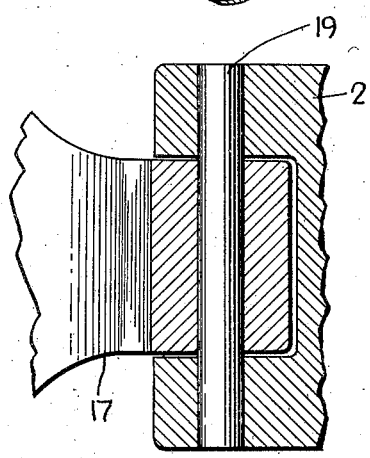
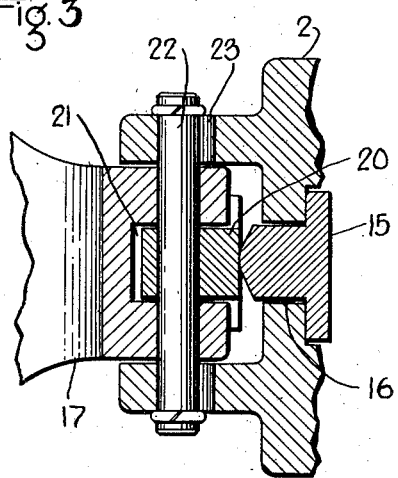
INVENTOR
GEORGE K. NEWELL
BY *Wm. M. Cady*
ATTORNEY Patented Dec. 20, 1938

2,141,070

UNITED STATES PATENT OFFICE 2,141,070

DIAPHRAGM FOOT VALVE

George K. Newell, Pitcairn, Pa., assignor to The Westinghouse Air Brake Company, Wilmerding, Pa., a corporation of Pennsylvania Application September 14, 1937, Serial No. 163,801

14 Claims. (Cl. 251—134)

This invention relates to lever controlled valve devices and more particularly to that type of valve device in which the lever acts through the medium of a flexible diaphragm having integrally formed thereon a valve or which engages and controls the operation of a separate valve.

Valve devices of the above mentioned types may be employed for various purposes, but they have been found particularly useful in controlling the venting communication from the safety control pipe of a safety car control equipment to prevent an unintentional emergency application of the brakes from being effected when the operator removes his hand from the controller handle or the brake valve handle as the case may be and to cause an emergency application of the brakes in the event of the incapacitation of the operator. In such valve devices the lever for controlling the operation of the valve is in the form of a foot pedal which is adapted to be depressed by the weight of the operator's foot.

The lever ratio employed in a valve device of the above type is such that merely the weight of the operator's foot without any additional pressure is sufficient to hold the valve of the device closed. The operator may, however, apply more pressure to the pedal than necessary to hold the valve seated and this pressure may be such as to cut or otherwise damage the flexible diaphragm. Such damage is objectionable in that fluid under pressure would be permitted to leak from the safety control pipe and might cause an emergency application of the brakes which could not be released without cutting out the "Deadman's" safety feature.

The principal object of the present invention is to provide an improved valve device of the above types having means for limiting the valve seating pressure applied to the flexible diaphragm by the operating lever and regardless of excessive pressure applied to the lever.

In the accompanying drawing: Fig. 1 is a sectional view of a foot valve embodying my invention; Fig. 2 is a fragmentary sectional view taken on the line 2—2 of Fig. 1; and Fig. 3 is a fragmentary sectional view taken on the line 3—3 of Fig. 1.

The valve device shown in the drawing and embodying the invention is of the foot controlled type which is especially adapted for use in controlling the venting communication from the safety control pipe of a safety car control equipment and may comprise a body section 1 and a cap section 2 which is secured in any desired manner to the body section. The body section is provided with a flange 3 by which the casing is adapted to be received to the floor or any other suitable fixed part of the vehicle body.

Clamped between the casing sections 1 and 2 is a flexible diaphragm 4 at one side of which is a valve chamber 5 which is connected to an outlet passage 36 and which contains a valve 6 which may be separate from but operatively engaged by the diaphragm 4. The valve 6 is provided with a short stem 8 which is slidably guided in the casing section 1, and which is provided with a longitudinal peripheral slot 9 which terminates at the face side of the valve and to which is connected a control passage 10 in the stem. The passage 10 is in constant open communication with an inlet passage 11 formed in the casing of the body section 1. The passage 11 is connected to a pipe 12 which, in the present embodiment of the invention, may be in constant open communication with a safety control pipe not shown. Contained in the passage 11 and interposed between and operatively engaging the end of the valve stem and the casing section is a spring 13 which normally holds the valve away from its seat which is formed on a bushing 14 contained in passage 11 and having a press fit with the casing of the body section 1.

The opposite side of the diaphragm 4 engages a follower 15 having a stem 16 which extends through a guide opening provided in the cap section and terminates within a recess 18 also provided in the cap section.

The follower 15 is provided for the purpose of controlling the operation of the valve 6 and is operative by means of a foot controlled pedal arrangement which comprises a foot pedal 17 and a lever 20 having arms 20a and 20b which are preferably disposed at right angles to each other. The inner end of the pedal 17 is contained in the recess 18 and is pivotally mounted on a pin 19 secured to the cap section 2 and the outer end extends beyond the cap section so as to accommodate the operator's foot. The pedal on the underside of its inner end is provided with a recess or cavity 21 for the reception of the upper end of the arm 20b. Within the recess 21 the arm 20b is pivotally mounted on a pin 22 which is located below the pin 19 and carried by the pedal and which, at each end, extends through a slot 23 in one of the side walls of the recess 18. At a point located slightly below the pin 22 the right hand edge of arm 20b of the lever 20 operatively engages the end of the follower stem 16.

Interposed between and operatively engaging the outer end of the arm 20a of the lever 20 and the underside of the pedal 17 is a spring 24 which pedal and arm are provided with spring pockets 25 and 26, respectively, for the reception of the opposite ends of the spring.

Assuming the several parts of the control valve device to be in their normal valve open position as shown in Fig. 1, and it is desired to seat the valve to close communication between the passage 12 and the diaphragm chamber 5, the operator, by the weight of his foot, causes the pedal 17 to rock in a counterclockwise direction about the pin 19. The pin 22 is moved by the pedal and causes the lever 20 to move and force the plunger 15 and thereby the diaphragm 4 and valve 6 in a direction toward the right hand, seating the valve against the opposing pressure of the spring 10, the spring 24 being heavy enough to prevent any appreciable movement of the lever 20 relative to the pedal 17 during the seating movement of the valve 6.

If the operator should exert additional pressure on the pedal 17 after the valve 6 has been seated, the pin 22 and upper end of the arm 20b of the lever 20 will move further in the counter-clockwise direction and since the follower stem 16 engages the arm 20b at a point below the pin 22, the lever 20 will rock in a clockwise direction about the end of the stem, the stem acting as a fulcrum for the lever when the valve is seated. This movement is yieldably opposed by the spring 24 until such time as the pin 22 engages the casing at the right hand end of the slots 23 and thereby brings the pedal to a positive stop.

It should here be mentioned that the force exerted on the diaphragm while the valve 6 is seated will not be sufficient to cause the diaphragm to be cut or otherwise damaged by the follower 15 and valve 16 even though the force applied to the pedal is great enough to cause the pin 22 to engage the casing of the cap section at the right hand ends of the slots 23.

From the foregoing description it will be seen that pedal 17 and lever 20 will move as a unit in response to the weight of an operator's foot to seat the valve 6 even though there may be variations in the travel of the valve due to wear or inaccuracies in the manufacture of the several parts of the device, and that after the valve is seated the lever 20 will move relative to the pedal and compress spring 24 in response to excessive pressure applied to the pedal and thus prevent excessive pressure from being transmitted from the pedal to the diaphragm 4 and valve 6.

It will be understood that while the invention has been described as being embodied in a valve device having a flexible diaphragm through medium of which the valve is adapted to be controlled the invention may be employed in any other kind of valve device in which it is desired to limit the seating pressure applied to the valve. Therefore while one illustrative embodiment of the invention has been described in detail it is not my intention to limit its scope to that embodiment or otherwise than by the terms of he appended claims.

Having now described my invention what I claim is new and desire to secure by Letters Patent, is:

1. In a valve device comprising a casing having a fluid conducting communication, in combination, valve means operative to close said communication, lever means rockably carried by the casing and being slidable horizontally relative to the casing for actuating said valve means, and a lever rockably carried by the casing for actuating the lever means, said lever means being adapted to operate to prevent excessive force from being transmitted from said lever to said valve means when the valve means is in communication closing position.

2. In a valve device comprising a casing having a fluid conducting communication, in combination, valve means operative to close said communication, lever means rockably carried by said casing and slidable horizontally relative to the casing for actuating said valve means, and a lever rockably carried by said casing and pivotally connected to said lever means for actuating the lever means, said lever means being adapted to absorb excessive force which may be applied to said lever while said valve means is in communication closing position.

3. In a valve device comprising a casing having a fluid conducting communication, in combination, valve means operative to close said communication horizontally relative to the casing by said casing, a lever rockably carried by said pedal for movement relative to said pedal and being movable horizontally relatively to the casing by said pedal to actuate said valve means, and means preventing movement of the lever relative to said pedal during the operation of said valve means to communication closing position and for permitting such relative movement upon movement of said pedal after the valve means has been moved to communication closing position.

4. In a valve device comprising a casing having a fluid conducting communication, in combination, valve means operative to close said communication, a pedal rockably carried by said casing, a lever rockably carried by said pedal for movement being movable horizontally relative to the casing to said pedal and operative by said pedal to actuate said valve means, and means cooperating with said pedal and lever for preventing rocking movement of the lever relative to said pedal during the operation of said valve means to its communication closing position and for permitting such relative rocking movement upon movement of the pedal after the valve means has been moved to communication closing position.

5. In a valve device comprising a casing having a fluid conducting communication, in combination, valve means operative to close said communication, and a mechanism for actuating said valve means, said mechanism comprising an operating lever pivotally carried by said casing, a member carried by said lever and movable thereby horizontally relative to the casing for actuating said valve means, said member being rockable relative to said lever, and means preventing said member from rocking relative to said lever until the valve means is in communication closing position and then upon further actuation of said lever permitting the member to rock relative to said lever.

6. In a valve device comprising a casing having a fluid conducting communication, in combination, valve means operative to close said communication, and a mechanism for actuating said valve means, said mechanism comprising an operating lever pivotally carried by said casing, a member carried by said lever and movable thereby horizontally relative to the casing for actuating said valve means, said member being rockable relative to said lever, and means interposed between and operatively engaging said member and lever preventing said lever from rocking relative to said lever until the valve means is in communication closing position and then upon the continued actuation of said lever permitting the member to rock relative to said lever.

7. In a valve device comprising a casing having a fluid conducting communication, in combination, valve means operative to close said communication, and a mechanism for actuating said valve means, said mechanism comprising an operating lever pivotally carried by said casing, a member carried by said lever and movable thereby horizontally relative to the casing for actuating said valve means, said member being rockable relative to said lever, and resilient means interposed between and operatively engaging said member and lever for insuring movement of said member and lever as a unit during the movement of the valve means to communication closing position and permitting relative rocking movement between said member and lever upon continued movement of the lever after the valve means is in communication closing position.

8. In a valve device comprising a casing having a fluid conducting communication, in combination, valve means operative to close said communication, and a mechanism for actuating said valve means, said mechanism comprising an operating lever pivotally carried by said casing, a member carried by said lever and movable thereby horizontally relative to the casing for actuating said valve means, said member having a lost motion connection with said lever adapted to permit relative rocking movement between the member and lever, and means adapted to prevent relative movement between said member and lever during movement of the valve means to communication closing position and for permitting such movement upon actuation of said lever after the valve means is in communication closing position.

9. In a valve device comprising a casing having a fluid conducting communication, in combination, valve means operative to close said communication, a flexible diaphragm through the medium of which said valve is moved to communication closing position, a follower member for effecting the operation of said diaphragm and thereby said valve, a member movable horizontally relative to the casing for actuating said follower, a lever for actuating said member, a lost motion conection between said member and lever through the medium of which said lever actuates said member and which permits relative rocking movement between the lever and member, and means yieldably resisting such relative rocking movement between the lever and member.

10. In a valve device comprising a casing having a fluid conducting communication, in combination, valve means operative to close said communication, a flexible diaphragm through the medium of which said valve is moved to communication closing position, a follower member for effecting the operation of said diaphragm and thereby said valve, a member movable horizontally relative to the casing for actuating said follower, a lever for actuating said member, a lost motion connection between said member and lever through the medium of which said lever actuates said member and which permits relative rocking movement between the lever and member, and means interposed between and operatively engaging the member and lever yieldably resisting such relative movement between the lever and member.

11. In a valve device comprising a casing having a fluid conducting communication, in combination, valve means operative to close said communication, a flexible diaphragm through the medium of which said valve is moved to communication closing position, a follower member for effecting the operation of said diaphragm and thereby said valve, a member movable horizontally relative to the casing for actuating said follower, a lever for actuating said member, a lost motion connection between said member and lever through the medium of which said lever actuates said member and which permits relative rocking movement between the lever and member, and means cooperating with said member and lever for preventing such relative rocking movement during the time said valve is being moved to communication closing position and for permitting such relative movement upon movement of said lever subsequent to movement of the valve to communication closing position.

12. In a valve device comprising a casing having a fluid conducting communication, in combination, valve means operative to close said communication, a flexible diaphragm through the medium of which said valve is moved to communication closing position, a follower member for effecting the operation of said diaphragm and thereby said valve, a member movable horizontally relative to the casing for actuating said follower, a lever for actuating said member, a lost motion connection between said member and lever through the medium of which said lever actuates said member and which permits relative rocking movement between the lever and member, said lost motion connection being located at one side of the connection between the member and said follower, said follower tending to effect lost motion between the member and lever, and means for preventing lost motion between the member and lever until the valve is in communication closing position and for then permitting such relative movement.

13. In a valve device comprising a casing having a fluid conducting communication, in combination, a valve operative to close said communication, means including a follower for actuating said valve, an actuating lever pivotally carried by said casing, a member carried by said casing and slidable horizontally relative thereto operative by said lever for actuating said follower said member being pivotally connected at one end to said lever at a point located between the pivotal connection between the lever and casing and the operating connection between the member and follower so that said follower tends to rock said member relative to said lever upon operation of the lever, and means for preventing said follower from rocking said member when the valve is being moved to communication closing position and for permitting rocking movement of the member when the valve is in communication closing position.

14. In a valve device comprising a casing having a fluid conducting communication, in combination, valve means operative to close said communication, lever means carried by said casing and slidable horizontally relative to the casing operative to actuate said valve means, and a lever rockably carried by the casing and pivotally connected to said lever means for actuating said lever means, and yielding means interposed between said lever means and said lever through which operating pressure is transmitted from said lever to said lever means.

GEORGE K. NEWELL.

CERTIFICATE OF CORRECTION.

Patent No. 2,141,070.   December 20, 1938.

GEORGE K. NEWELL.

It is hereby certified that error appears in the printed specification of the above numbered patent requiring correction as follows: Page 2, second column, lines 20 and 21, claim 3, for "com- able horizontally relative to the casing" read communication, a pedal rockably carried; lines 37 and 38, claim 4, strike out "being movable horizontally relative to the casing to said pedal and operative" and insert instead relative to said pedal and being movable horizontally relative to the casing; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.